June 15, 1937.  C. GRIMM  2,083,906

CLUTCH MECHANISM

Filed June 9, 1936  2 Sheets-Sheet 1

INVENTOR
Charles Grimm
BY Benjamin Kahn
ATTORNEY

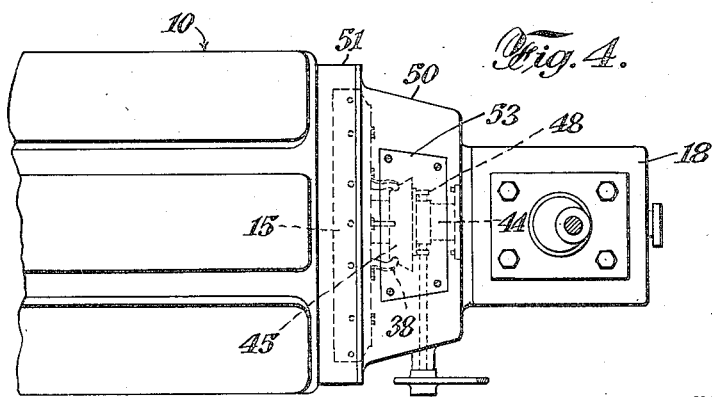

Patented June 15, 1937

2,083,906

UNITED STATES PATENT OFFICE 2,083,906

CLUTCH MECHANISM

Charles Grimm, Brooklyn, N. Y.

Application June 9, 1936, Serial No. 84,254

3 Claims. (Cl. 192—76)

This invention relates generally to friction clutches for engaging or coupling two independently axially alined shafts together; particularly to devices of this character employed on automobiles for frictionally engaging the engine shaft to the transmission shaft.

A further particular of this invention is the employment of such a clutch device which is adapted to cooperate with a centrifugal action and with the engine flywheel forming part of the clutch proper.

Ordinarily, in devices of this class, it has been the practice to provide the friction surface on the web of the flywheel cooperating with the friction shoes or discs in a plane transverse to the shaft axis, and the shoes or discs are covered by an operating disc also in the plane of the transverse axis; the shoes or discs are thus enclosed making replacement of the disc or shoes difficult. In other devices of this class where a single annular conical frictional band is employed to engage a co-acting conical surface of the flywheel, such a single annular band precludes the removal thereof without dismantling a major portion of the structure.

In such devices having a conical friction surface and separate independently movable shoes cooperating therewith, it was found that during increased rotation, the shoe supporting means tended to move axially in the direction toward the base of the cone, due to the axial component of the centrifugal force acting on the cone of the flywheel, thus creating a back pressure on the means urging the engaging faces into frictional contact.

One of the main objects of the invention is the provision of a simple and efficient clutch mechanism having certain novel and desirable features accomplished by the particular combination and arrangement of parts hereinafter described.

Another of the main objects of the present invention is to provide a clutch structure of the class described in which the shoes are easily removable without dismantling the entire assembly.

Another object of the invention is to arrange the parts in such a manner that the engaging frictional surfaces of the parts of the respective shafts, upon increased rotation have no tendency to create a back pressure on the operating means urging their engagement.

A still further object is to provide such a mechanism wherein the increased speed of rotation creates an increased pressure between the engaging surfaces of the clutch.

In carrying out my invention, I contemplate the provision of a plurality of frictional shoes of such shape as to provide a substantially continuous cylindrical surface to engage the inner and cylindrical portion of a flywheel, the shoes being of a size less than an opening in a flywheel housing through which manual access to the shoes may be had for disengagement from the device, and thru which the shoes may easily pass and thus be easily removable.

I further contemplate to mount these independent cylindrical shoes on members of such substantial mass whereby the increased speed of rotation creates a centrifugal force in these members to urge the shoes into greater frictional contact with an inner flange of the flywheel, whereby a greater effort is required to disengage the clutch during high speed condition than in a lower speed condition.

I further contemplate the provision of means for independently adjusting the operative relationship of the independent shoe and their carrying member whereby worn and new shoes operate substantially with equal gripping pressure and under substantially the same conditions.

In order that the invention may be thoroughly understood and easily carried into practice, reference will be had to the drawings illustrating one embodiment of my invention. It is understood, however, that minor changes may be made in the structure without departing from the principle of the invention, and it is desired to be further understood that such changes may be readily made without departing from the principles of my invention claimed hereinafter.

In the drawings:

Figure 3 is a sectional view substantially on the line 3—3 of Figure 2.

Figure 4 is a plan view of Figure 1.

Figure 1:
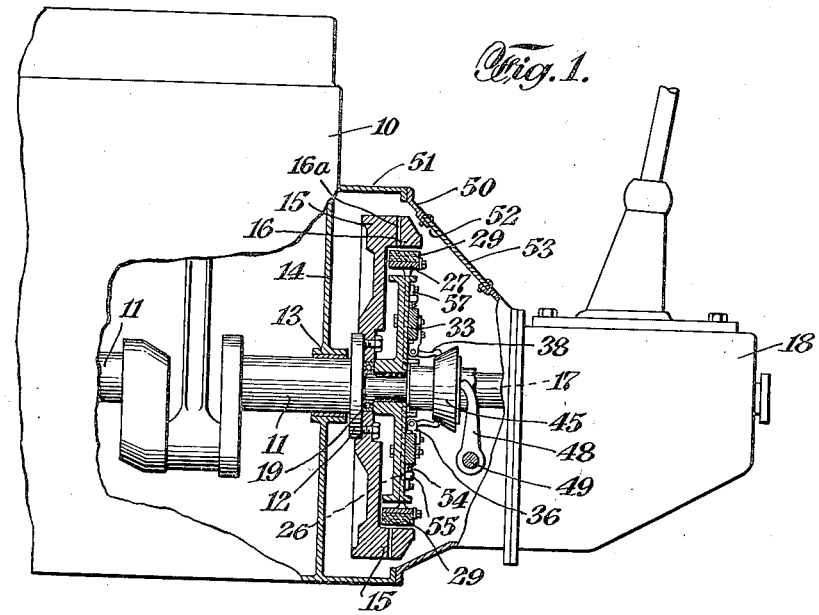
Figure 1 is a side elevation of a fragment of an engine having associated therewith a flywheel and a transmission mechanism; with certain parts broken away and other parts shown in section.
Figure 2:
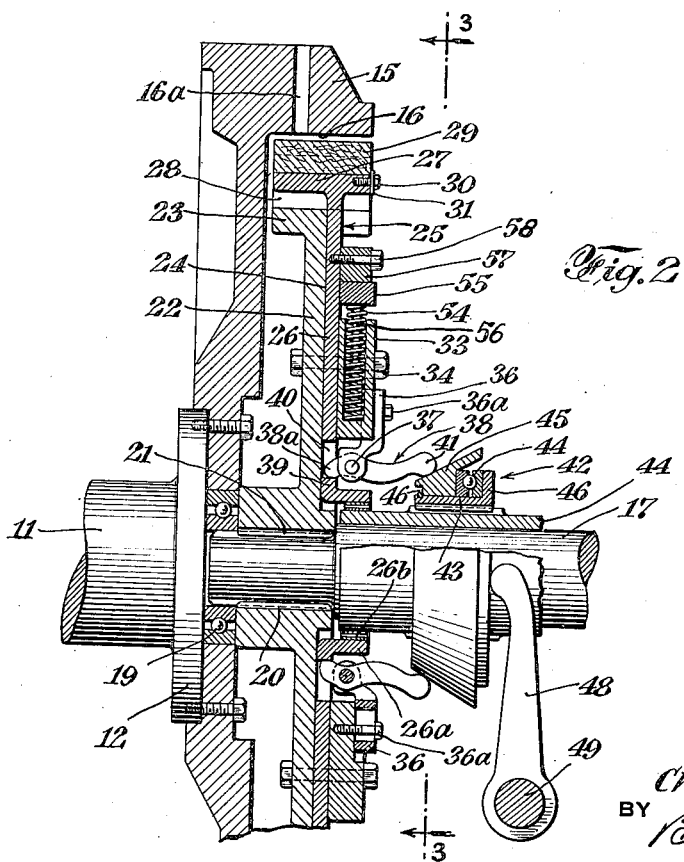
Figure 2 is a fragmentary sectional view on an enlarged scale of some of the parts illustrated in Figure 1, showing the structure of my invention in greater detail.

Referring to Figures 1 and 2, the reference character 10 designates generally an engine having a crankshaft 11 provided with a flywheel mounting flange 12 external of the engine and supported in suitable bearings 13 in a wall of the engine housing 14.

Secured to the mounting flange 12 is a flywheel 15 having thereon a cylindrical face internally arranged as at 16. Coaxial with the shaft 11 is a shaft 17 of a transmission mechanism 18. This shaft is suitably supported at its free end in bearings 19 between it and the shaft 11.

Splines 20 on the free end of shaft 17 are adapted to engage splines in the central hub 21 of a mounting plate 22 having a peripheral flange 23 within substantially the same plane of the cylindrical surface 16 of the flywheel.

Adapted to slide in radially disposed grooves 24 in the mounting plate 22 is a plurality of T-shaped shoe-supporting members 25, each having a leg portion 26 adapted to fit in the grooves 24; and head portions 27 adapted to overlie the flanges 23 of the mounting plate and extending between projections 28 on the periphery of the flange of the mounting plate at the circumferential ends of the head portions.

Friction shoes 29 are suitably secured to the heads 27 as by means of bolts 30 having enlarged head portions 31, or washers if preferred, for preventing the displacement of the shoe axially toward the transmission mechanism. The shoes are prevented from axial movement in the opposite direction by the flywheel web.

The friction shoes 29 are held against radial displacement from the heads 27 by a dove-tail connection with the heads as indicated at 32. To retain the shoe-supporting member 25 in position against circumferential movement on the mounting plate 22, a hold-down ring 33 is secured to the face of the clutch disc and overlies the slots 24 containing the legs 26 of the shoe-supporting member. This ring 23 is secured to the mounting plate by suitable means such as bolts 34 at points between the slots. The hold-down ring is provided with a central opening 35. Adjustably secured to the ring 33 is a plurality of inwardly directed pivot supporting members 36, adjustable radially as by means of a bolt 36a passing through a slot in the member 36. The members 36 are adapted to pivots 37 for shoe support operating fingers 38.

Inner ends 38a of the operating fingers are adapted to engage ledges 39 in inner portions of the legs 26, said ledges being provided by slots 40 at this point in the legs. The other ends 41 of the fingers are adapted to engage a finger operating means 42 slidable axially and surrounding the shaft 17 of the transmission mechanism. This clutch finger operating means comprises a flanged bushing 43 slidably arranged on a stationary sleeve 44 surrounding the transmission input shaft 17 and suitably secured to the transmission housing. On the sleeve portion of this flanged bushing is mounted a thrust bearing 44 and a conical collar 45 having its outer conical periphery adapted to engage the free ends 41 of the fingers 38.

A split lock-ring 46 may be provided on the sleeve member 43 to retain the thrust bearing 44 and the conical collar 45 in position against a flange 46 on the sleeve 43.

The usual clutch operating fork 48 is pivoted as at 49 and is adapted to act against the flange 46 of the sliding sleeve, whereby the shoe supporting members 25 are caused to move inwardly, thus disengaging the shoes 29 from frictional engagement with the surface 16 of the flywheel.

A clutch housing 50, surrounding the clutch parts, is suitably secured to a flywheel housing 51 extending from the engine. The clutch housing is secured at its other end to the transmission housing and is thus disposed between a flywheel housing and the transmission housing. This clutch housing is provided with a suitable inspection or hand-hole opening 52 and is adapted to be closed by a cover 53. This opening may be arranged on the top part of the housing 51 and thus be in position, immediately under the foot board of a vehicle, or the opening and cover therefore may be provided at the bottom of the clutch housing where it is thus accessible from the underside of the vehicle. The size of this opening need be sufficient for the insertion of one's hand and of such size as to permit the removal of a friction shoe, depending of course upon the size of shoe employed.

Compression springs 54 are suitably supported in the ring 33 and are arranged to urge the shoe-supporting members 25 outwardly and into engagement with the flywheel. The springs are adapted to act against cross bars 55, each held in position by pilots 56 extending inwardly from each of the cross bars and within the coils of the respective springs. Each of these bars 55 is adapted to engage a block 57 secured by a bolt 58 to the leg 26 of an associated shoe-supporting member. This block 57 has a hole therein for the reception of the bolt 58; the hole being disposed in such a manner as to be at different distances from the several faces of said block. By selectively arranging one of the several faces of the blocks 57 in contact with the bar 55, the spring pressure acting upon the shoes associated therewith may be varied. By this means the working pressure of each of the shoes may be independently varied whereby all the shoes may be caused to engage the flywheel with equal pressure.

Under normal running conditions the springs 54 urge the shoe-supporting members 25 outwardly and cause the shoes 29 to engage the surface 16 of the flywheel. The shoes thus frictionally engage the flywheel under pressure greater than the pressure created by the centrifugal action of the member 25, in that this pressure is augmented by the pressure provided by the springs. The weight of the shoe-supporting parts are preferably such as to provide a desirable pressure between the shoes and the flywheel necessary for properly engaging the two shafts 11 and 17 frictionally throughout its entire working-speed range.

When it is desired to disengage the clutch, the member 48 is caused to move counter-clockwise by pedal actuated means generally known and not shown, thus advancing the conical collar 45 and causing the fingers 38 to spread under the action of this movement of the conical collar. In disengaging the clutch the inner ends of the clutch operating fingers 38 are caused to move radially inward, thereby drawing the shoes inward and away from the flywheel. The lower end of leg 26 of the shoe-supporting member 25 is provided with a portion 26a disposed axially, and is provided with a friction pad 26b on its inner face, adapted to engage the stationary sleeve when the clutch is disengaged, thus preventing the free spinning of the mounting plate and thereby enabling the engagement of suitable gears in the transmission mechanism without grinding. It is particularly desirable to bring the mounting plate to a complete stop or nearly so immediately before engagement of the first speed gearing of the transmission from a standstill position of the vehicle when the transmission gears are at rest.

It will be noted that the radially movable parts 25 are of substantial weight, thereby creating a greater frictional pressure between the shoes and the flywheel during higher rotational speed of the parts. This is an advantageous construction in view of the fact that during sudden disconnecting of the engine from the vehicle, a sudden removal of the torque on the driving parts results in a severe reaction stress on these parts. Under normal pedal operation the increased effort necessary to disconnect the clutch at higher speed prevents the too sudden removal of the torque and thereby lengthens the period of pressure drop between the shoes and the flywheel. By a gradual disengagement of the parts, a gradual decrease of pressure between engaging surfaces is effected, thus cushioning the shock of the sudden load reaction due to the removal of torque from the driving parts.

When the shoes are worn and are desired to be removed, the cover 53 is removed from the housing thus enabling easy access to the uppermost bolt 30, the removal of which enables the removal of the uppermost shoe 29 axially from its dove-tail connection with its shoe-supporting member, whereupon the shoe may be easily taken out through the hole 52 in the clutch housing 50. Conversely a new shoe is easily replaced. The shoes may be successively brought to the uppermost position within easy manipulation of its associated parts thru said hole 58.

In order to adapt a new shoe of increased thickness to operate under the same conditions as other existing worn shoes, the clutch is disengaged, the new shoe inserted and then all shoes are allowed to come into operative engagement with the surface 16. The operating finger 38 of the new shoe will, however, not engage the portion 39 of the leg 26, whereupon the bolt 36a is loosened and the pivot supporting member 36 is adjusted so that the end 41 of the finger is caused to contact with the conical collar and with the portion 39 of the shoe supporting member. By this adjusting means all shoes can be made to break away from frictional contact with the flywheel, simultaneously.

In order to effect equal contacting pressures of varying shoes of various thickness, the adjusting block 57 is rotated to vary the pressure of its respective shoe in accordance with the other shoes. Although the block 57 is indicated as providing four varying pressure adjustments, it will be seen that by providing more faces or by providing a block with an unlimited number of faces such as in the form of an eccentric, the pressure may be adjusted infinitely.

Having thus described the principle of my invention in connection with one operative embodiment it is obvious that variations may be had in minor details without departing from the scope of the following claims.

What I claim as my invention, and desire to secure by Letters Patent, is:—

1. A clutch mechanism comprising in combination, a power input shaft, a power output shaft, a flywheel secured to the power input shaft having a flange forming an internally disposed cylindrical surface, a mounting plate secured to said output shaft, independent clutch shoe supporting members on said mounting plate movable radially, clutch shoes on said supporting members adapted to frictionally engage said cylindrical surface, spring means associated with each of said shoe supporting members urging engagement of the shoes with said cylindrical surface, and exposed adjusting means associated with said spring means on said supporting members and for varying the pressure of said springs whereby the pressure of engagement of each of said clutch shoes with said cylindrical surface is independently adjustable with said elements in operatively assembled relationship.

2. A clutch mechanism comprising in combination, a power input shaft, a power output shaft, a flywheel secured to the power input shaft having a flange forming an internally disposed cylindrical surface, a mounting plate secured to said output shaft, independent clutch shoe supporting members on said mounting plate movable radially, clutch shoes on said supporting members adapted to frictionally engage said cylindrical surface, spring means associated with each of said shoe supporting members urging engagement of the shoes with said cylindrical surface, independent means each respectively associated with one of said spring means for varying the pressure thereof, a radially fixed and axially slidable connection between the shoes and their supports, means for positioning said shoes on said supports axially under said cylindrical surface, means for retracting said shoes from engagement simultaneously, a casing for said mechanism, and an opening in said casing for manual access to said means for positioning said shoes, whereby said shoes are individually removable from said casing.

3. A clutch mechanism comprising in combination, a power input shaft, a power output shaft, a flywheel secured to the power input shaft having a flange forming an internally disposed cylindrical surface, a mounting plate secured to said output shaft, independent clutch shoe supporting members on said mounting plate movable radially, clutch shoes on said supporting members adapted to frictionally engage said cylindrical surface, spring means assciated with each of said shoe supporting members urging engagement of the shoes with said cylindrical surface, exposed independent means on said supporting members and each respectively associated with one of said spring means for varying the pressure of engagement of the shoes with said cylindrical surface, means for retracting said shoes simultaneously, a casing for said mechanism, and an opening in said casing permitting manual access to said pressure varying means, whereby the pressure of said shoes is individually adjustable.

CHARLES GRIMM.